(12) United States Patent
Hofman et al.

(10) Patent No.: US 9,961,874 B2
(45) Date of Patent: *May 8, 2018

(54) DOUBLE-GRIPPER FOR THE APPLICATION OF TEAT CUPS TO AN ANIMAL TO BE MILKED, RINSE CUP FOR THIS AND MILKING MACHINE PROVIDED THEREWITH, AND A METHOD FOR MILKING

(71) Applicant: Technologies Holdings Corp., Houston, TX (US)

(72) Inventors: Hendrik Hofman, Lemmer (NL); Peter van der Sluis, IJsselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/715,923

(22) Filed: Sep. 26, 2017

(65) Prior Publication Data

US 2018/0020631 A1    Jan. 25, 2018

Related U.S. Application Data

(63) Continuation of application No. 15/490,182, filed on Apr. 18, 2017, now Pat. No. 9,807,974, which is a
(Continued)

(30) Foreign Application Priority Data

May 2, 2014  (NL) ...................................... 2012747

(51) Int. Cl.
*A01J 5/017*  (2006.01)
*A01J 7/04*  (2006.01)
(Continued)

(52) U.S. Cl.
CPC ............... *A01J 5/0175* (2013.01); *A01J 7/04* (2013.01); *B25J 11/0045* (2013.01);
(Continued)

(58) Field of Classification Search
CPC .. A01J 5/0175; A01J 5/044; A01J 5/08; A01J 7/025; A01K 1/12
(Continued)

(56) References Cited

U.S. PATENT DOCUMENTS

| 4,805,557 | A |   | 2/1989 | Van Der Lely |
| 5,279,253 | A | * | 1/1994 | Lubberink ............ A01J 5/0175 119/14.08 |

(Continued)

FOREIGN PATENT DOCUMENTS

| EP | 0862360 | 9/1998 |
| EP | 1943897 | 7/2008 |

(Continued)

OTHER PUBLICATIONS

Communication pursuant to Article 94(3) EPC; Application No. 15 166 155.0-1655; 6 pages, dated Dec. 5, 2016 received Jan. 15, 2016.
(Continued)

*Primary Examiner* — Yvonne R Abbott-Lewis
(74) *Attorney, Agent, or Firm* — Baker Botts L.L.P.

(57) ABSTRACT

This invention is related to a double grab, its rinsing cup and milking machine provided therewith, and the method for automatically applying test cups to the teats of an udder of an animal to be milked. The double grab according to the invention includes: —a first housing part provided with a first magnet designed to hold a first teat cup; —a second housing part, installed substantially in a horizontal plane next to the first housing part, provided with a second magnet designed to hold a second teat cup; —whereby each housing part is provided with separate pivoting means that can be
(Continued)

activated and is designed to make the related housing part pivot around a pivoting axis which in use, extends substantially in a horizontal direction, substantially in a widthwise direction of the arm.

14 Claims, 6 Drawing Sheets

Related U.S. Application Data continuation of application No. 15/307,877, filed as application No. PCT/IB2015/053243 on May 4, 2015, now Pat. No. 9,807,973.

(51) Int. Cl.
  B25J 11/00 (2006.01)
  B25J 15/00 (2006.01)
  F16B 1/00 (2006.01)
  B25J 15/06 (2006.01)

(52) U.S. Cl.
  CPC ....... *B25J 15/0052* (2013.01); *B25J 15/0616* (2013.01); *F16B 1/00* (2013.01); *F16B 2001/0035* (2013.01); *Y10S 901/40* (2013.01)

(58) Field of Classification Search
  USPC ............ 119/14.02, 14.08, 14.1, 14.18, 14.03
  See application file for complete search history.

(56) References Cited

U.S. PATENT DOCUMENTS

| | | | | |
|---|---|---|---|---|
| 5,713,301 A | * | 2/1998 | van der Lely | A01J 5/0175 119/14.02 |
| 6,341,575 B1 | * | 1/2002 | Forsen | A01J 5/0175 119/14.08 |
| 6,729,262 B2 | * | 5/2004 | Ealy | A01J 5/0175 119/14.08 |
| 7,908,998 B2 | * | 3/2011 | Wase | A01J 5/0175 119/14.08 |
| 8,342,124 B2 | * | 1/2013 | Axelsson | A01J 7/025 119/14.02 |
| 8,438,991 B2 | * | 5/2013 | Van Den Berg | A01J 5/08 119/14.02 |
| 8,646,410 B2 | * | 2/2014 | Van Den Berg | A01J 5/0175 119/14.02 |

FOREIGN PATENT DOCUMENTS

| | | |
|---|---|---|
| NZ | 597815 | 1/2012 |
| WO | WO 9946978 | 9/1999 |
| WO | WO 2010/028912 | 7/2009 |
| WO | WO 2010/060693 | 6/2010 |
| WO | WO 20126502 | 9/2012 |

OTHER PUBLICATIONS

Canadian Intellectual Property Office; Office Action for Application No. 2,946,365; 4 pages, Dec. 20, 2016.
Canadian Office Action, Application No. 2,946,365, 3 pages, dated Feb. 9, 2017.
European Patent Office, International Search Report and Written Opinion issued for PCT/IB2015/053243, 10 Pages, dated Aug. 19, 2015.
New Zealand Intellectual Property Office "First Examination Report", 3 pages, dated Apr. 27, 2017.

* cited by examiner

DOUBLE-GRIPPER FOR THE APPLICATION OF TEAT CUPS TO AN ANIMAL TO BE MILKED, RINSE CUP FOR THIS AND MILKING MACHINE PROVIDED THEREWITH, AND A METHOD FOR MILKING

PRIORITY

This application is a continuation of U.S. Ser. No. 15/490,182 filed Apr. 18, 2017 which is a continuation of U.S. Ser. No. 15/307,877 filed Oct. 31, 2016 which is a U.S. National Stage Patent Application under 37 U.S.C. § 371 of International Patent Application No. PCT/IB2015/053243, filed May 4, 2015, which claims the benefit and priority of Patent Application No. NL 2012747, filed in the Netherlands on May 2, 2014, the entire contents of each of which are hereby incorporated by reference in their entirety.

This invention regards a double grab or gripping device which is mountable on an arm of a milking machine for applying automatically teat cups to the teats of an udder of an animal to be milked. Such animals which are to be milked may be cows and goats for instance.

Milking machines, among which milking robots, are known from practice and most of the time, they use an arm to which a grab is attached. Such a grab applies a teat cup to a teat of an udder of an animal to be milked. In practice, a teat cup is picked up by a grab and most often is brought towards the udder from the side of the animal. With the use of a sensor, detector, camera or any other means of assistance, the precise position of the separate teat is determined, possibly in combination with identification data from the database of a milking machine with respect to the respective animal. Subsequently, the teat cup is connected. For that, each teat cup is separately positioned with requires a relatively large number of movements in space of the grab with respect to the animal. This produces anxiety and a lack of composure on the part of the animal to be milked. This also requires a considerable time for positioning and locating the teat cups at the desired locations so that the milking process as a whole can take place less effectively.

US 2012/0055408 A 1 describes a robotic arm for a milking machine with which multiple teat cups can be brought at the same time in the vicinity of the udder of the animal to be milked. Holders are somewhat sideways provided to a robotic arm so that the teat cups can be positioned correctly. For that, some space is required in order to be able to move the arm with the teat cups towards the desired position and for instance, to avoid unnecessary contact between the milking machine and the animal to be milked.

The purpose of this invention is to solve or at least to reduce the abovementioned problems when applying the cups during a milking process.

For that purpose, said invention provides a double grab mountable onto an arm of a milking machine for applying teat cups automatically to an udder of an animal to be milked, whereby the double grab comprises:
 a first housing part provided with a first magnet designed for holding a first teat cup;
 a second housing part, installed substantially in a horizontal plane next to the first housing part, provided with a second magnet designed for holding a second teat cup;
 whereby each housing part is provided with pivoting means that are activatable separately, designed to make the relative housing part pivot around a pivoting axis which in use extends substantially in a horizontal direction, substantially in widthwise direction of the arm.

For said invention, by milking machine is understood among other milking robots and a milking rotary. The arm, among which also a robotic arm is understood, of a milking machine as fixed component of the milking machine, can also be provided as a separate facility.

By providing at least a first and a second housing part, at least two teat cups can be held at the same time, or retained, in the double grab. More holders may possibly be provided.

The advantage of a double grab provided with a first and a second housing part is that this way at least two teat cups can be positioned nearly at the same time near the udder of the animal to be milked, while at the same time, the width of the arm with the held teat cups can remain limited. According to the invention, this width can be further limited since each housing part is provided with pivoting means that are activatable separately. According to the invention, these pivoting means are installed to make the housing part pivot around a pivoting axis which substantially extends in a horizontal direction and substantially in the widthwise direction of the arm. This makes it possible to make the housing part after connecting a first teat cup, pivot downward so that the second teat cup can be connected without the teat cups hindering each other and/or making contact with the animal to be milked. Because of the pivoting means, both housing parts can be installed relatively close to each other, so that the whole set of the arm with the double grab and the teat cups which are held by it, can remain limited in width. Prior to applying the first teat cup to a teat with the first housing part, the second housing part can also pivot somewhat downward so that also the first teat cup can be applied with maximum space. This also prevents that this second teat cup during positioning of the first teat cup comes in contact with a teat or another part of the animal to be milked which can make the animal become restless. This way, according to the invention, with the double grab, a number of teat cups can efficiently be connected without having to move the arm fully back in order to pick up a new teat cup. This way, the lead time for connecting the teat cups, and optionally removing the teat cups at the end of the milking process, can be carried out efficiently.

In a currently preferred embodiment, besides the pivoting axis, the pivoting means include a cylinder for pivoting the relative housing part around the pivoting axis. That way, by retracting the cylinder in the currently preferred embodiment, a downward pivoting of the housing part can be achieved while by extending the cylinder, an upward pivoting motion of the housing part is being achieved. The cylinder involves for instance a hydraulic, electric or pneumatic cylinder.

The first and second housing parts are both preferably provided with a magnet for holding the teat cup. This way, with the help of the magnet, the double grab can pick up in a relatively simple way a teat cup with a housing part, transport it and connect in the proper manner on a teat of an animal to be milked. After completing the milking process, the teat cup can be removed efficiently in the opposite sequence.

In a currently preferred embodiment according to the invention, the magnet is a permanent magnet which is installed movably in or at an individual housing part. By installing the permanent magnet in a movable fashion in the housing part, contact between the housing part and a teat cup can be efficiently made or broken. For instance, a magnet is moved towards the end of the housing part so that the magnet can make direct physical contact or indirect magnetic contact with the teat cup and can pick it up, transport and/or connect or remove it. By moving the magnet subsequently, said direct or indirect contact between the magnet and the teat cup will be broken so that the teat cup will be released from the housing part. Consequently, an effective connection and removal of the teat cups belongs to the possibilities. Preferably, the magnet is placed in a movable plastic housing with respect to the steel housing part.

Preferably, the permanent magnet is movable substantially in the lengthwise direction of the arm. By moving the magnet substantially in the lengthwise direction of the arm, the width of the whole system of arm, housing parts and teat cups, seen in the widthwise direction of the arm substantially in the horizontal plane, remains limited irrespective of the position of the permanent magnet in a housing part. When sliding the magnet towards the end of the arm, the magnet exerts an attraction on the teat cup so that the latter is attracted and is kept in the housing part. By sliding the magnet backwards, the force of the attraction will diminish or disappear completely so that the teat cup does not necessarily rests against the housing part and will be released. Consequently, a teat cup can be picked up and released in an efficient way with the double grab according to the invention.

Preferably, the permanent magnet is in a beneficial embodiment connected in working order with a first drive for moving the magnet within the housing part. For that purpose, if desired, a hydraulic cylinder can also be used or another pneumatic or electric drive.

In a beneficial preferred embodiment according to this invention, at least one of the housing parts is provided with a sliding mechanism, whereby the sliding mechanism is designed to pull back the housing part some distance in the lengthwise direction of the arm.

By providing a sliding mechanism, the related housing part can be pulled back somewhat from the end of the arm to which the double grab is secured. This produces some space at the front of the arm for the other housing part with another teat cup. Namely, in combination with the pivoting means, with which a pivoting movement of the housing part is possible, sufficient space is produced at the front of the arm to connect or to remove a teat cup without, at that very moment, the non-active housing part and a teat cup that may have been placed in it coming into contact with a teat or another part of the animal to be milked. Consequently, the animal remains peaceful during the milking process.

Because of the combined pivoting and retracting movement, both of which are performed in the extension of the arm, the width of the arm to which the grab is secured, remains limited. This way, while using relatively limited space, a number of teat cups, preferably two, can be connected or removed. In addition, one avoids unnecessary contact with the animal to be milked with a part of the milking machine which might negatively affect the peace and tranquility of the animal. An additional advantage of the small embodiment of the arm with the double grab is that the latter is particularly suitable for applying and removing teat cups between the hind legs of the animal to be milked. For instance, this is beneficial in case of a milking rotary.

The sliding mechanism can preferably be activated through the pivoting means. By connecting the sliding mechanism in operating form with the pivoting means, with the help of a single drive, the pivoting movement as well as the sliding movement of the related housing part can be achieved. For instance, it is part of the possibilities to produce the pivoting motion with the help of a hydraulic, pneumatic or electric cylinder and withdrawing or extending of the cylinder to achieve an additional sliding movement of the related housing part with respect to the arm. This way, with a limited number of components, such a combination of movements of the housing part with respect to the arm can be achieved.

In another beneficial preferred embodiment according to this invention, the double grab is provided with contact means located between the first and second housing parts designed for making contact with a rinsing cup.

By providing contact means which make contact with a rinsing cup, it becomes possible for the double grab, except for connecting or removing teat cups of an animal to be milked, to use the latter also for connecting or removing a rinsing cup. By providing contact means between the first and second housing parts, one can position the rinsing cup in the extension of the arm. Its advantage is that the width of the arm comprising the installed double grab, can be limited during use and maximum space is obtained for positioning the rinsing cup with respect to the teats of the animal to be milked. If desired, other components can also be positioned in a manner similar to the rinsing cup, such as for instances, brushes or other cleansing tools, with the double grab according to the invention with respect to the udder of the animal to be milked.

It will become evident that the double grab according to the invention can be connected and operated with a detector or sensor for detecting a teat. For such detector or sensor, it is understood that a range of accessories may be used for positioning the teat cups with respect to the teats, among which a camera system, acoustic sensors, laser systems, etc. Such a detector is known from the current state of the art and it can operate according to various principles. Such a detector may be helpful for positioning the teat cup with respect to the animal to be milked. Besides providing a single detector, according to the invention, several detectors may also be used, for instance one detector per housing part. With it, a teat cup can be positioned with accuracy.

Furthermore, said invention is related to a rinsing cup suitable for inclusion in a double grab as described above.

Such rinsing cup offers similar effects and benefits as described for the double grab. In particular, the rinsing cup includes contact members designed to be held by a magnet or onto a housing part. In that case, the magnet is preferably provided in one of the housing parts. The contact member is preferably provided at the rinsing cup and is preferably shaped in such a way that it can be held by the magnet in the housing part in a manner similar to the one described previously for a teat cup. For instance, the contact member can be embodied as a kind of a half moon with dimensions based on those of the teat cup so that it fits in a housing part. If desired, one can provide more than one, for instance two, contact members in order to be able to keep the rinsing cup for instance in two housing parts. If desired, one may also position more than one rinsing cup with the double grab. However, considering the complexity of the rinsing process, in the currently preferred embodiment the rinsing cup is performed in such a way that one rinsing cup with a double grab can be positioned in order to carry out the rinsing process in an efficient way.

Said invention is also related to a milking machine provided with a double grab as described previously.

Such a milking machine offers the same effects and benefits as described for the grab and/or rinsing cup. The arm, particularly carried out as a robotic arm, is preferably controlled from the milking machine. For positioning the teat cup with respect to the teats, the arm is preferable movable with a number of translations in an xyz space and/or with a number of rotations around related axes or centerlines. The milk machine involves for instance in particular, an automatic milking robot. The double grab can also be applied to other types of milking machines.

Furthermore, the invention is also related to a method for milking an animal, with the method comprising the following steps:
providing a milking machine as previously described;
connecting the first teat cup with a grab;
pivoting the first housing part; and
connecting the second teat cup with a grab.

Such a method offers similar effects and benefits as described for the double grab and/or rinsing cup and/or milking machine. By pivoting a first housing part after connecting the first teat cup, additional space is provided for the second housing part for purposes of positioning a second teat cup. Preferably, prior to connecting the first teat cup, the second housing part is somewhat pivoted in order to increase by so doing the space for connecting the first teat cup.

In the currently preferred embodiment, after connecting the first teat cup, the first housing part, seen in the lengthwise direction of the arm, is moved backward over a distance. In so doing, additional space is provided for the second housing part with the second teat cup. In this case, it has appeared especially beneficial to carry out this sliding movement or translation movement previously, in connection or in combination with the aforementioned pivoting movement. If desired, when removing the teat cups, these movements can be carried out in an opposite sequence.

In another beneficial embodiment, for the rinsing process, a rinsing cup is provided in or at the double grab. In so doing, the double grab according to the invention, can be applied in an effective manner, not only for connecting or removing the teat cups, but also for positioning the rinsing cup during the rinsing process.

Other benefits, features and details of the invention are explained by means of the preferred modes of embodiment, whereby reference is made to the attached drawings, in which.

Figure 1:
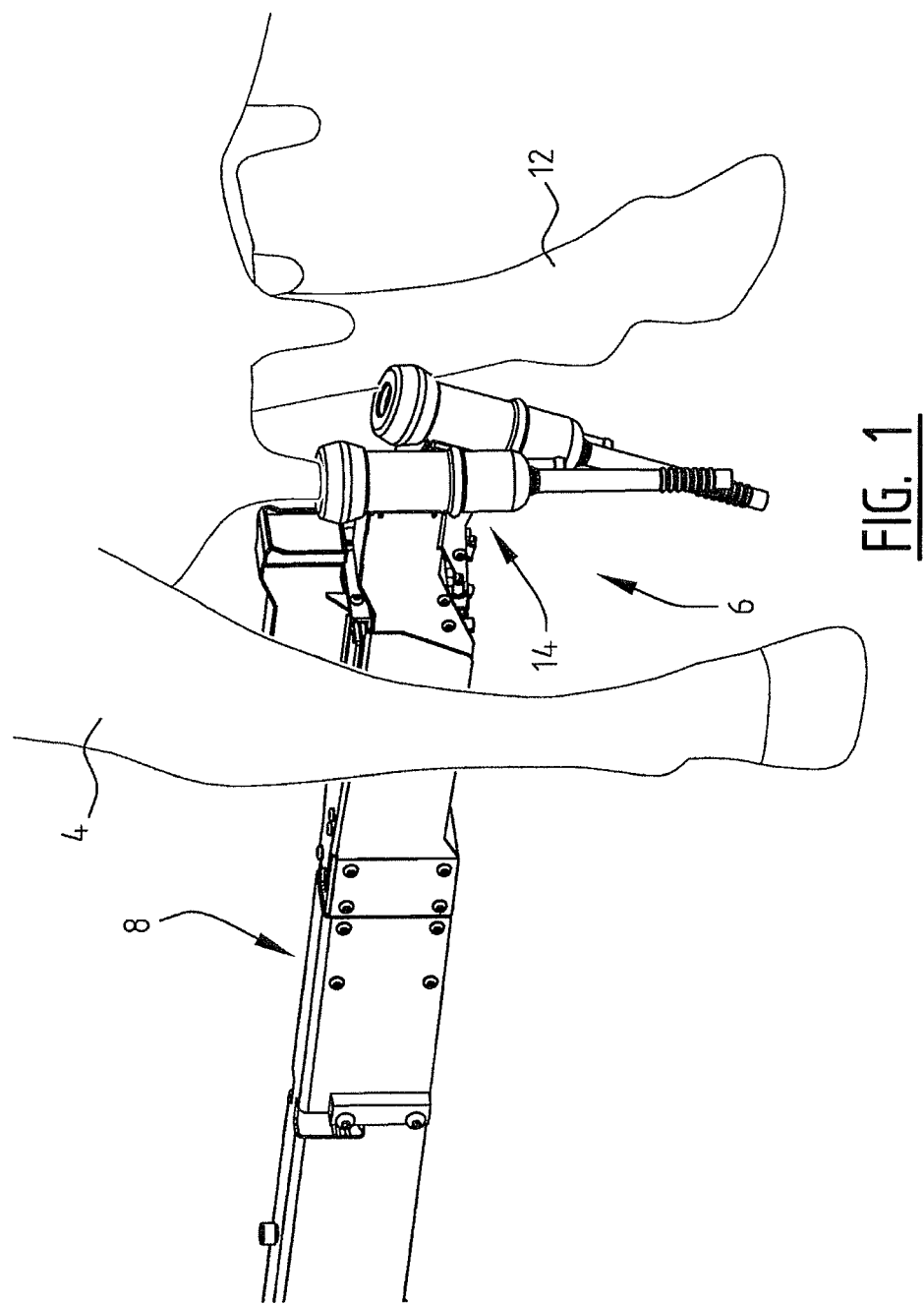
FIGS. 1 and 2 show views of a double grab according to the invention.
Figure 5A:
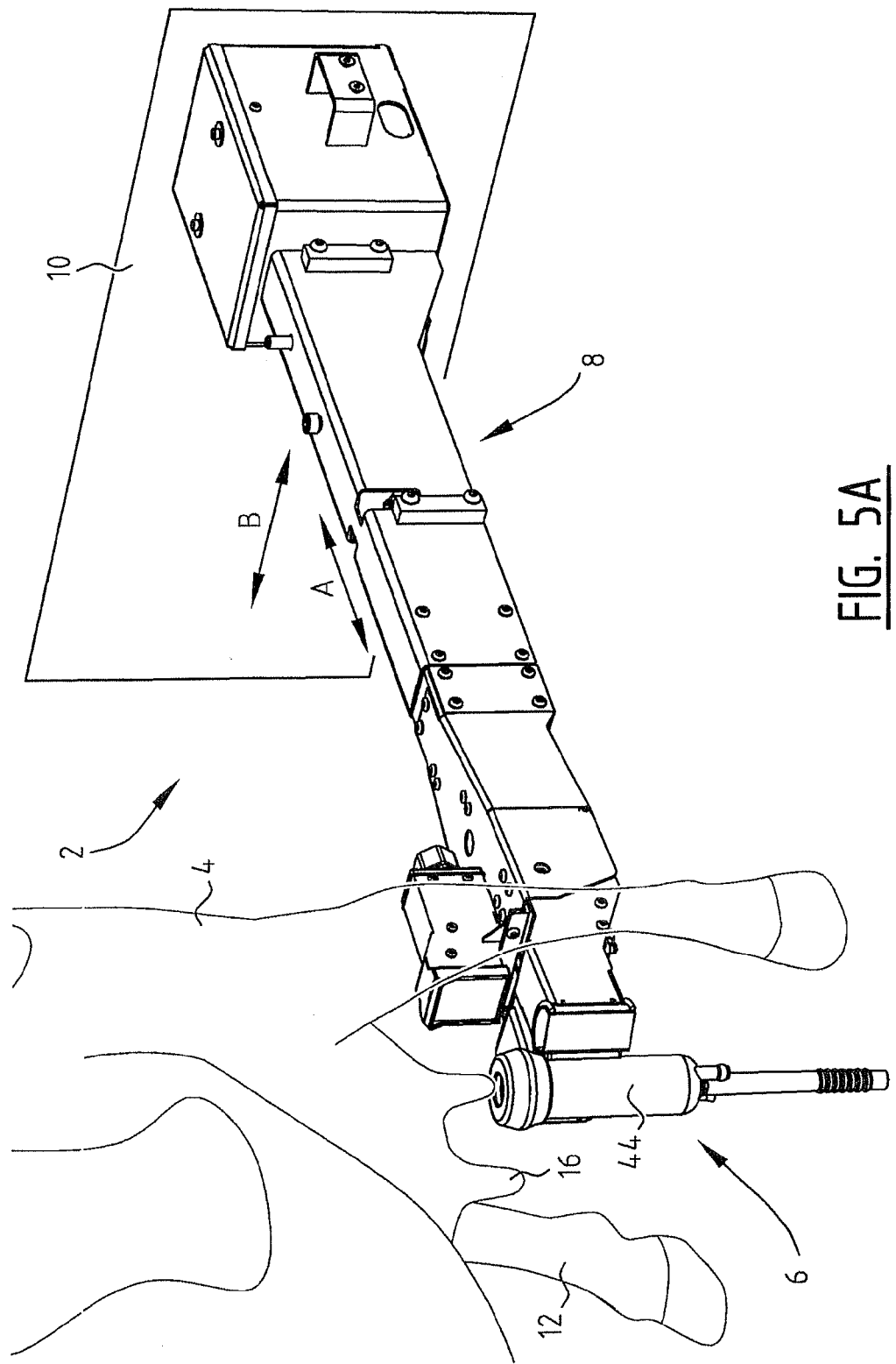
FIGS. 5 A and B, show a view of the arm with the double grab with a rinsing cup.
Figure 5B:
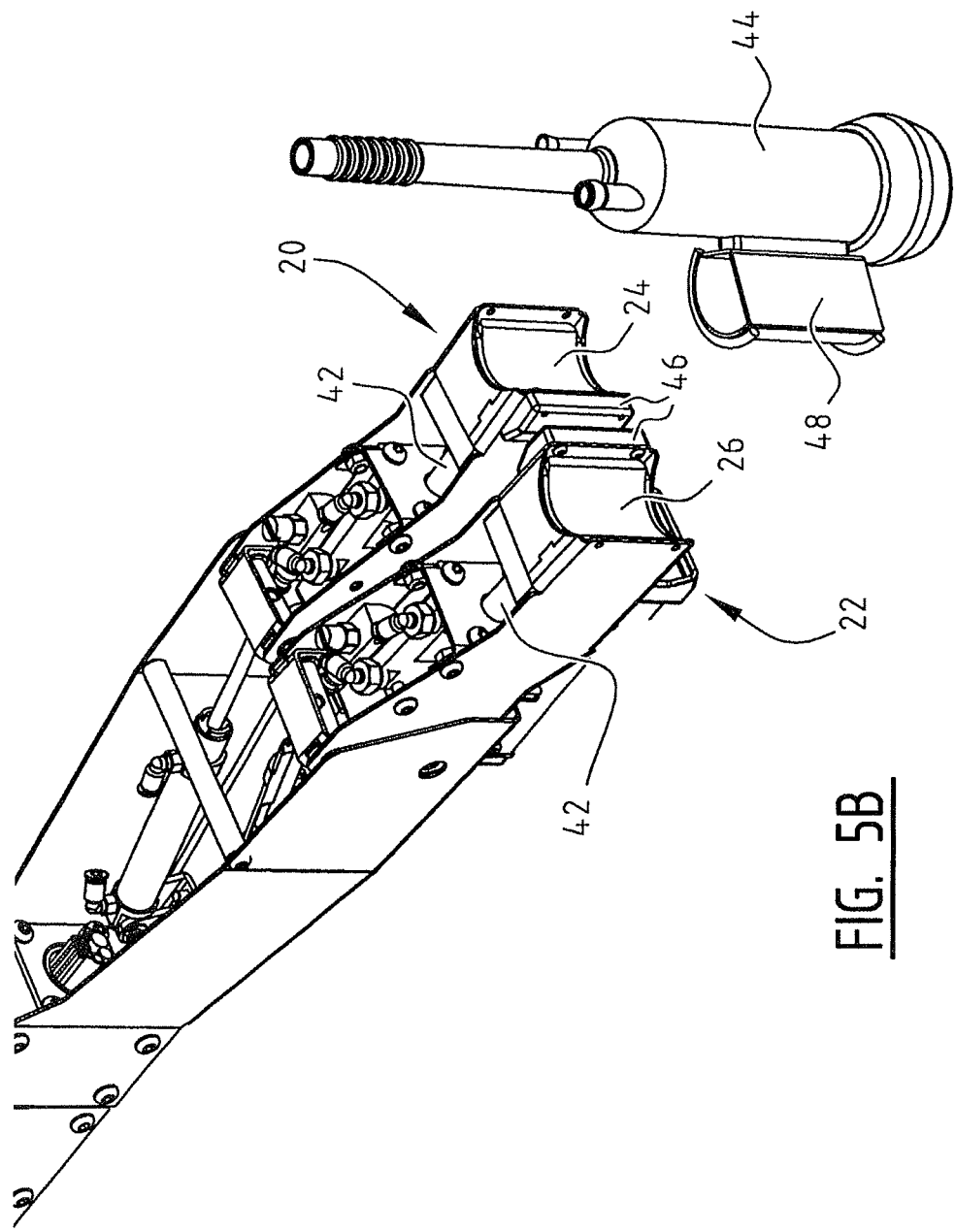

Milking facility 2 with an animal to be milked 4 is provided with a double grab 6 (FIGS. 1 and 5). Double grab 6 is installed at an arm 8 which is connected with frame 10 of milking machine 2. In the embodiment shown, arm 8 is positioned between the hind legs 12 of the animal to be milked 4 for applying the teat cups 14, as well as optionally, also for removing the teat cups 14 from teats 16 of udder 18 of the animal to be milked 4.

Figure 2:
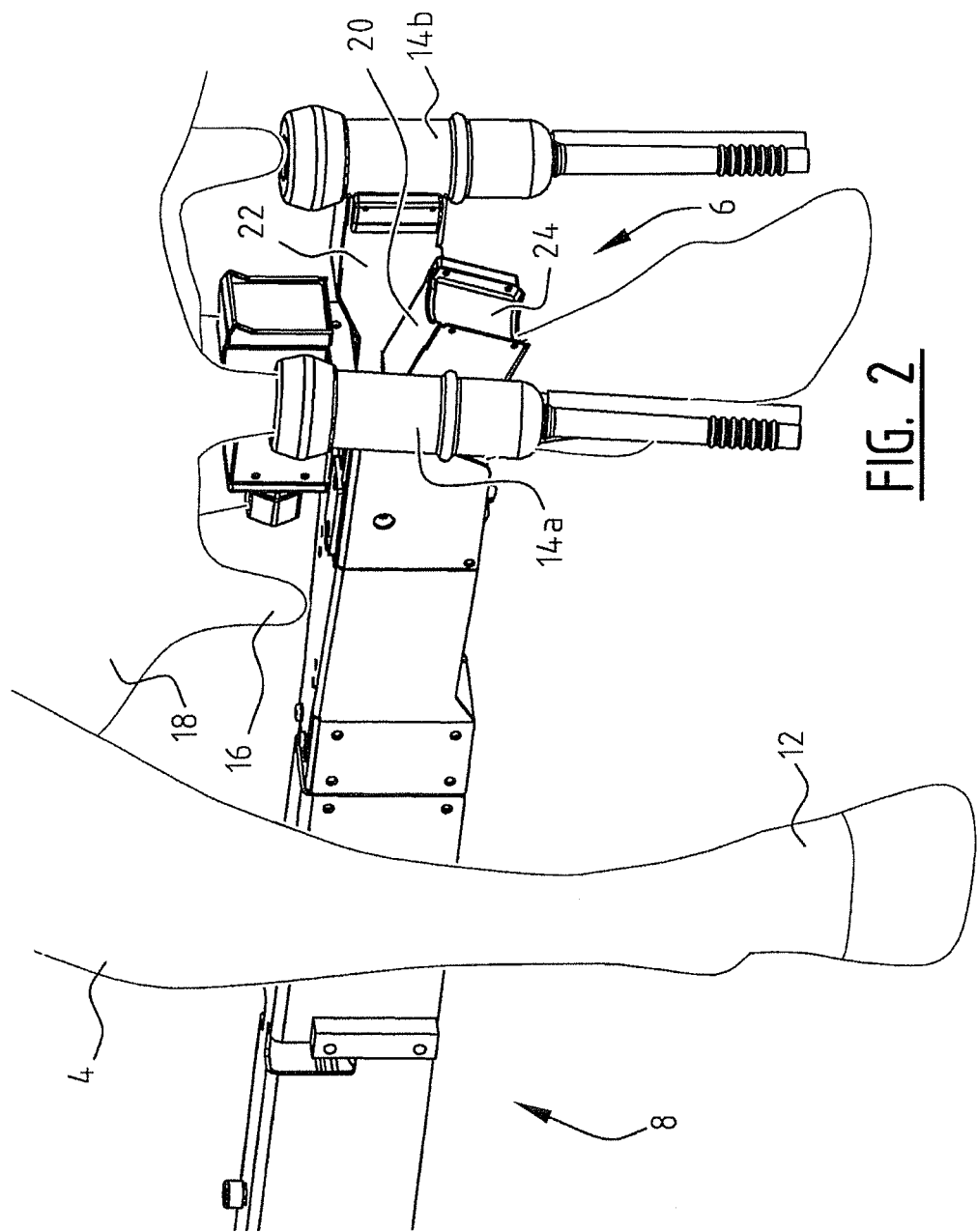

Double grab 2 (FIG. 2) is provided with a first housing part/holder 20 and a second housing part/holder 22 with first magnet 24 and second magnet 26, respectively.

When applying a first teat cup 14a with arm 8, double grab 2 (FIG. 2) is positioned between the hind legs 12 of the animal to be milked 4. First teat cup 14a is connected to one of the teats 16 of the animal to be milked 4, whereby first teat cup 14a is held in first housing part 20 of double grab 6. In the embodiment shown, second holder 22 with second teat cup 14b has been brought in a downward pivoted position in order to simplify connection of the first teat cup 14a.

After connecting first teat cup 14a (FIG. 1) onto a teat 16 of the animal to be milked 4, second teat cup 14b (FIG. 2) is connected. For that purpose, the second housing part 22 is pivoted upward and the first housing part 20 is pivoted downward in order to obtain sufficient space for applying second teat cup 14b onto teat 16. For that, arm 8 is positioned with respect to the second teat 16. In the embodiment shown, first holder 20 is provided with a first permanent magnet 24 which after positioning first teat cup 14a is placed somewhat withdrawn in first housing part 20. Magnet 26 of second housing part 22 has in the shown embodiment just been moved forward to make contact with second teat cup 14b so that the latter can be brought in the desired position onto teat 16 of the animal to be milked 4.

Figure 3:
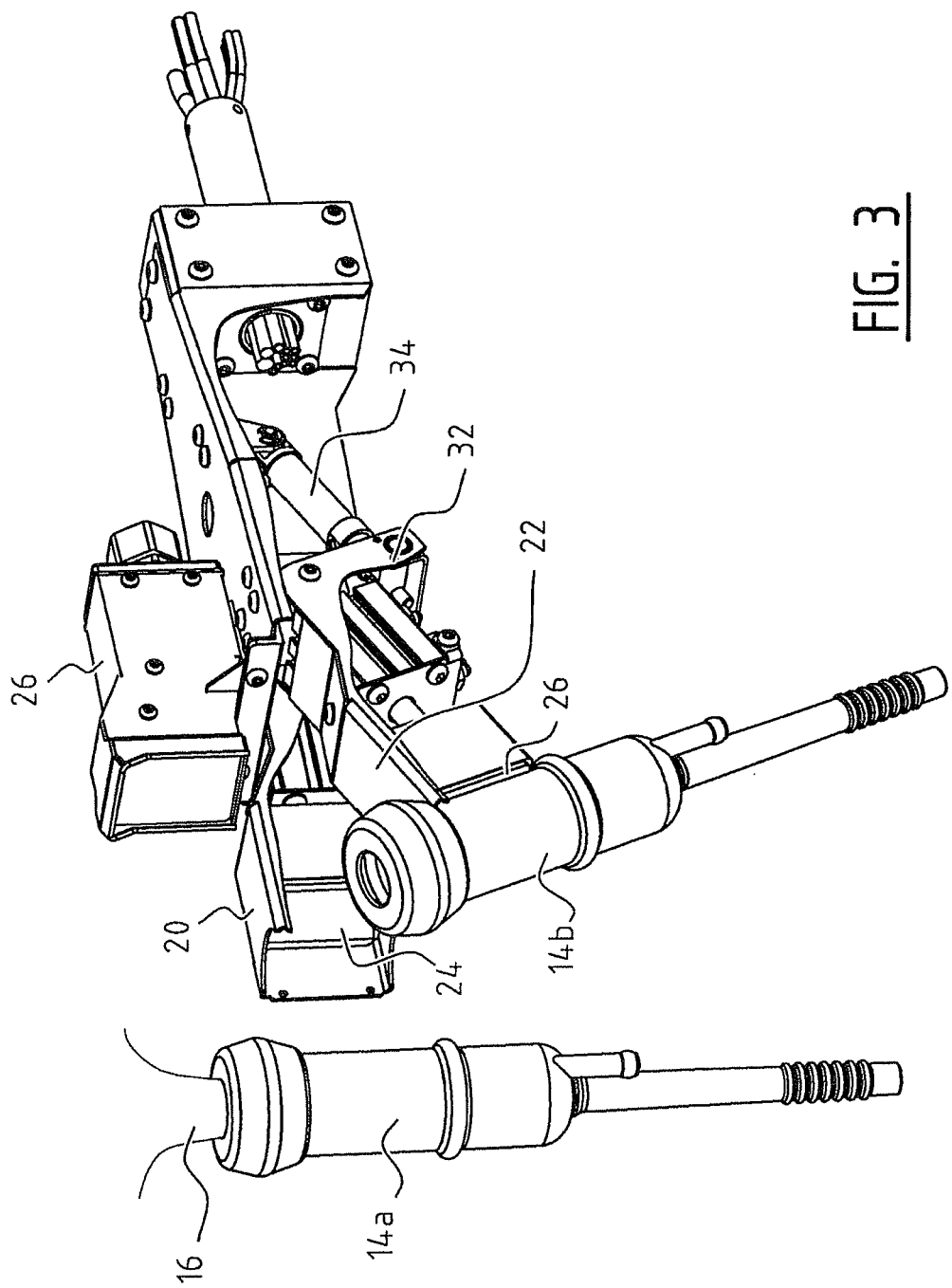
FIGS. 3 and 4 show views of positioning the teat cups with the double grab from FIGS. 1 and 2.
Figure 4:
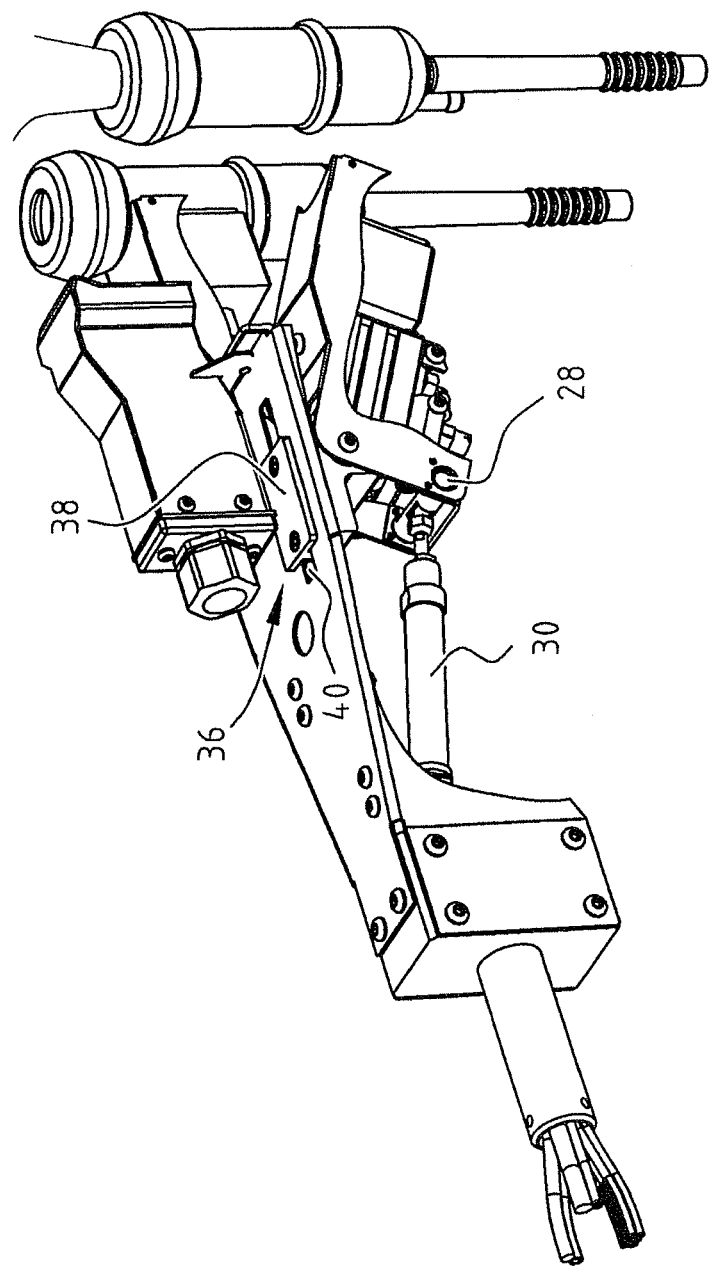

In the embodiment shown, detector 26 (FIGS. 3 and 4) has been installed on top of arm 8 with double grab 6 so that positioning of teat cups 14a, 14b with respect to teats 16 of the animal to be milked 4 can be simplified. First housing part 20 can pivot around pivoting axis 28 using cylinder 30. By retracting in cylinder 30, the first housing part 20 is pivoted downward and in the shown embodiment, it is rotated around axis 28. Second housing part 22 can be pivoted around axis 32 using a second cylinder 34. In the shown embodiment, sliding mechanism 36 is also provided with which first housing part 20 is movable in the lengthwise direction of arm 8, in direction A. In the shown embodiment, because of retracting cylinder 30, first housing part 20 will pivot around pivoting axis 28 and will also slide backward in the direction of A with the help of a guide 38 which is movable in slot 40.

In the shown embodiment, second housing part 22 is only pivotable around axis 32 and is not provided with a sliding mechanism 36. Consequently, cylinder 34 for the second housing part 22 can be provided with a shorter stroke and can thus be performed shorter in comparison with cylinder 30 for first housing part 20. Furthermore, this permits that the cylinders seen in lengthwise direction A of arm 8 are mounted in full or in part behind each other to arm 8 so that the width in direction B of grab 6 and arm 8 can remain limited. Moving of magnets 24, 26 is in the shown embodiment provided by a separate drive 42 installed in housing parts 20, 22.

Grab 6 (FIGS. 5 A and B) is also suitable for picking up and positioning of rinsing cup 44 with contact means 46 and contact member 48. In the shown embodiment, rinsing cup 46 is positioned in the extension of arm 8 with the help of contact means 46 provided between first and second housing parts 20, 22. Furthermore, in the shown embodiment, rinsing cup 44 is provided with moon-shaped contact member 48 that can be positioned in one of housing parts 20, 22. Keeping the moon-shaped contact member 48 in housing parts 20, 22 takes place in a manner similar to the one with which teat cups 14 are held in housing part 20, 22.

Prior to actual milking, during the milking process, first a rinsing process is carried out. For that, arm 8 is used to which grab 6 is secured to pick up rinsing cup 44 and for instance, to bring it between the hind legs 12 of the animal to be milked 4 towards teats 16 and to carry out the rinsing process. After the rinsing process, grab 6 can remove rinsing cup 44 in a similar manner. After the rinsing process, actual milking of the animal to be milked 4 can be carried out. For that, in the shown embodiment, double grab 6 is used to pick up first teat cup 14a and second teat cup 14b and to position it for instance between the hind legs 12 of the animal to be milked 4 with respect to teats 16 of the animal to be milked 4. For applying first teat cup 14a, second housing part 22 is pivoted somewhat downward around pivoting axis 32 with the help of retracting second cylinder 34. First teat cup 14a is then applied on a teat 16. After correctly positioning of the first teat cup 14*a*, magnet 24 is moved backward in direction A so that first teat cup 14*a* is released by grab 6. Then, first housing part 20 is pivoted downward around pivoting axis 28 and slid backward via sliding mechanism 36 in direction A by retracting first cylinder 30. Second housing part 22 is pivoted upward so that second teat cup 14*b* can be positioned with respect to another teat 16 of the animal to be milked 4. After teat cup 14 is correctly positioned, magnet 26 on second housing part 22 is slid backward in direction A so that second teat cup 14*b* is released from second housing part 22. Arm 8 with grab 6 is then moved again and if so desired, two other teat cups 14 are positioned. After completing the actual milking process, for removing teat cups 14, the movements can, if so desired, be carried out in the opposite sequence.

In the shown embodiment, teat cups 14 are mostly manufactured from a coated steel material and magnets 24, 26 are installed in plastic housing parts, which are movable with the help of air cylinders 42 (FIG. 5B) for instance. In the shown embodiment of double grab 6, housing parts 20, 22 is slidable independently from each other around their respective pivoting axis 28, 32, whereby first housing part 20 is slidable in a direction A in the lengthwise direction of arm 8.

The present invention is not limited in any way to the embodiments described above. The requested rights are determined by the following claims within the scope of which many modifications may be considered. For example, it is part of the possibilities to provide additional teat cups or to supply them in another manner so that arm 8 does not have to be brought back fully.

The invention claimed is:

1. A double grabber mounted on an arm of a robotic attacher, the double grabber comprising:
   a first housing part operable to hold a first teat cup; and
   a second housing part operable to hold a second teat cup and positioned side-by-side with the first housing part;
   wherein the first housing part is operable to retract longitudinally in relation to the arm of the robotic attacher in conjunction with the second housing part attaching the second teat cup to a dairy livestock; and
   wherein the second housing part is operable to retract longitudinally in relation to the arm of the robotic attacher in conjunction with the first housing part attaching the first teat cup to the dairy livestock.

2. The double grabber of claim 1, further comprising a cylinder to pivot the first housing part.

3. The double grabber of claim 1, wherein:
   the first housing part is operable to pivot downwardly in relation to the second housing part in conjunction with the second housing part attaching the second teat cup to the dairy livestock; and
   the second housing part is operable to pivot downwardly in relation to the first housing part in conjunction with the first housing part attaching the first teat cup to the dairy livestock;
   wherein the first housing part is operable to pivot independently of the second housing part.

4. The double grabber of claim 1, wherein:
   the first housing part is provided with a first magnet designed for holding the first teat cup; and
   the second housing part is provided with a second magnet designed for holding the second teat cup.

5. The double grabber of claim 4, wherein the first magnet is installed in a movable fashion in the first housing part.

6. The double grabber of claim 5, wherein the first magnet is movable substantially in the lengthwise direction of the arm.

7. The double grabber of claim 6, wherein the first magnet is operable to extend to grab the first teat cup and retract to release the first teat cup.

8. The double grabber of claim 5, wherein the first magnet is a permanent magnet.

9. The double grabber of claim 1, wherein the first housing part is operable to retract in the lengthwise direction of the arm.

10. The double grabber of claim 1, wherein the first housing part is operable to extend in the lengthwise direction of the arm.

11. The double grabber of claim 1, further comprising a contact member installed between the first and second housing parts and designed to make contact with a rinsing cup.

12. The double grabber of claim 11, whereby the contact member is designed such that the rinsing cup is substantially positioned in the extension of the arm.

13. The double grabber of claim 1, further comprising a cleansing tool.

14. The double grabber of claim 1, wherein the first housing part further comprises a moon-shaped contact member.

* * * * *